United States Patent
Imperante et al.

(10) Patent No.: US 6,972,316 B1
(45) Date of Patent: Dec. 6, 2005

(54) POLYESTERS HAVING IMPROVED WATER AFFINITY

(75) Inventors: John Imperante, Califon, NJ (US); Anthony J. O'Lenick, Jr., Dacula, GA (US)

(73) Assignee: Phoenix Research Corp, Sommerville, NJ (US)

( * ) Notice: Subject to any disclaimer, the term of this patent is extended or adjusted under 35 U.S.C. 154(b) by 94 days.

(21) Appl. No.: 10/909,789

(22) Filed: Aug. 2, 2004

(51) Int. Cl.$^7$ .............................................. C08G 63/48

(52) U.S. Cl. ................... 528/295.5; 528/300; 528/302; 525/437; 525/444.5

(58) Field of Search ............................ 528/295.5, 300, 528/302, 437, 444.5

(56) References Cited

U.S. PATENT DOCUMENTS

| 5,488,121 A | 1/1996 | O'Lenick | |
|---|---|---|---|
| 6,264,961 B1 * | 7/2001 | Ansmann et al. | ........... 424/401 |

\* cited by examiner

*Primary Examiner*—Samuel A. Acquah

(57) ABSTRACT

The present invention relates to a series of esters that are water insoluble and hydrophobic. Surprisingly however we have found that by selecting the proper polyester having (a) a dipentaerythritol portion, in which several hydroxyl groups remain unreacted and consequently polar, (b) a polyhydroxystearic acid polyester portion and (c) a mono-fatty acid portion esters that will have an affinity for water are prepared. These esters allow for the incorporation of three times their weight in water into pigmented products, where they improve creaminess, emmoliency, skin feel, humectancy and long wear.

19 Claims, No Drawings

POLYESTERS HAVING IMPROVED WATER AFFINITY

FIELD OF THE INVENTION

The present invention relates to a series of esters that are water insoluble and hydrophobic. Surprisingly however we have found that by selecting the proper polyester having (a) a dipentaerythritol portion, in which several hydroxyl groups remain unreacted and consequently polar, (b) a polyhydroxystearic acid polyester portion and (c) a mono-fatty acid portion esters that will have an affinity for water are prepared. These esters allow for the incorporation of three times their weight in water into pigmented products, where they improve creaminess, emmoliency, skin feel, long wear, and humectancy.

BACKGROUND OF THE INVENTION

The concept of water loving (hydrophilic) and water hating (hydrophobic) are concepts that are key to preparation of pigmented products. Pigmented products are hydrophobic, that is water hating. Recently the concept of hydrophobic (water hating) has been expanded by O'Lenick et al to include materials that are silicone loving (siliphillic) as opposed to oil loving (oleophillic). This was a necessary expansion to allow for the observation that the silicone oil and mineral oil hate water and consequently are hydrophobic, but at the same time they are insoluble in each other.

Despite the fact that pigmented products are hydrophobic, they contain many polar oils and esters which are difficult to keep in the various oil phases used in the formulation. In order to make a product with the proper aesthetics, we have surprisingly discovered that water is a good ingredient in these hydrophobic products. However in order to get the water into the product an ester having water affinity was needed. The search for such an ester has been elusive, until the present invention.

SUMMARY OF THE INVENTION

The present invention is drawn to a polyester compound having water affinity. This polyester is the reaction product of (a) a dipentaerythritol portion, in which several hydroxyl groups remain unreacted and consequently polar, (b) a polyhydroxystearic acid polyester portion and (c) a mono-fatty acid portion esters that will have an affinity for water are prepared.

OBJECT OF THE INVENTION

It is the object of the present invention to provide a series of specific polyesters that have an affinity for water, have low odor, good taste attributes and that can be used in a variety of pigmented products.

It is another object of the present invention to provide a process for conditioning the skin which comprises contacting the skin with an effective conditioning concentration of the polyesters of the present invention. Said effective conditioning concentration will range from 0.1% to 20% by weight.

Other objects of the invention will become clear as one reads the disclosure.

DETAILED DESCRIPTION OF THE INVENTION

The compounds of the present invention are polyesters prepared by the reaction of (a) a six hydroxyl functional compound known as dipentaerythritol which conforms to the following structure;

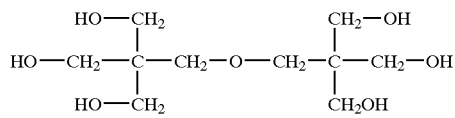

(b) a polymer made by the homopolymerization of 12 hydroxystearic acid conforming to the following structure:

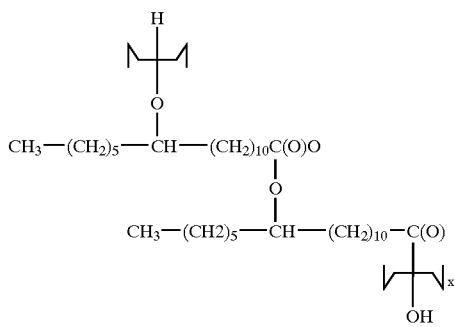

wherein:

x is an integer ranging from 3 to 10; and (c) a mono-functional fatty acid conforming to the following structure:

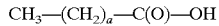

wherein a is an integer ranging from 8 to 20.

There are a number of positional isomers possible when making the compounds of the present invention. The preferred mole ratio is 1 mole of dipentaerythritol (having 6 groups), to 2 moles of mono-acid and two moles of poly hydroxystearic acid. There remain two unreacted hydroxyl groups. The compounds of the present invention can be represented by the following structure;

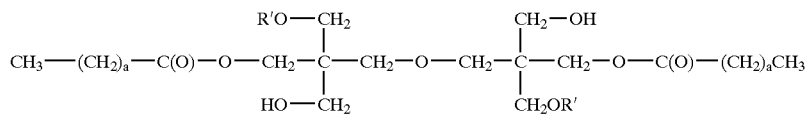

wherein
R' is

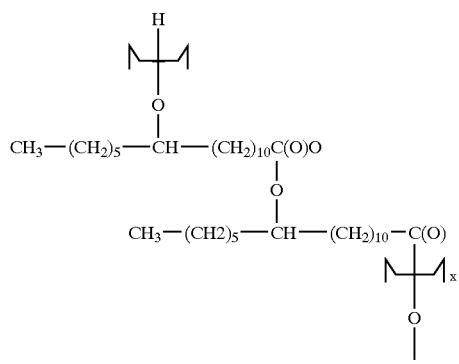

x is an integer ranging from 3 to 10;
a is an integer ranging from 8 to 20.

Another aspect of the present invention relates to a product by process for making a polyester made by the esterification reaction of:

(a) dipentaerythritol which conforms to the following structure;

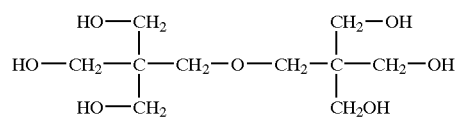

(b) a polymer made by the homopolymerization of 12 hydroxystearic acid conforming to the following structure:

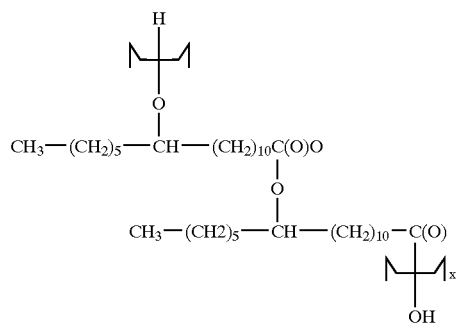

wherein:
x is an integer ranging from 3 to 10; and
(c) a mono-functional fatty acid conforming to the following structure:

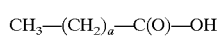

CH₃—(CH₂)ₐ—C(O)—OH wherein a is an integer ranging from 8 to 20.

PREFERRED EMBODIMENT

In a preferred embodiment x is an integer ranging from 18 to 20.
In another preferred embodiment x is 8.
In another preferred embodiment x is 10.
In another preferred embodiment x is 12.
In another preferred embodiment x is 14.
In another preferred embodiment x is 16.
In another preferred embodiment x is 18.
In another preferred embodiment x is 20.
In another preferred embodiment a is 3.
In another preferred embodiment a is 5.
In another preferred embodiment a is 7.
In another preferred embodiment a is 10.

EXAMPLES

Example 1

Dipentaerythritol is an item of commerce whish is commercially available from a variety of sources including Perstorp Corporation. It is marketed under the Dipenta tradename had has the following CAS number: 126-58-9. It conforms to the following structure;

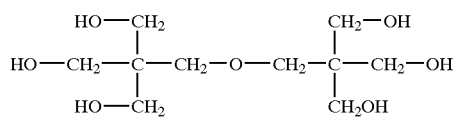

Examples 2–5

Polymers of 12 hydroxystearic acid are items of commerce commercially available from Phoenix Chemical in Somerville, N.J. They conforming to the following structure:

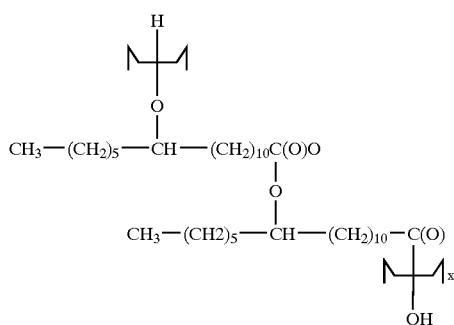

wherein:
x is an integer ranging from 3 to 10;

The commercial names below are given merely for reference. The structures were confirmed by GPC and other analytical methodologies.

| Example | x | Commercial Name |
|---------|-----|-----------------|
| 2 | 3 | Pelemol PHS-3 |
| 3 | 5 | Pelemol PHS-5 |
| 4 | 7 | Pelemol PHS-7 |
| 5 | 10 | Pelemol PHS-10 |

Examples 6–12

Fatty acids are items of commerce available from a variety of sources including Proctor and Gamble. They conform to the following structure:

$$CH_3-(CH_2)_a-C(O)-OH$$

wherein a is an integer ranging from 8 to 20.

| Example | a | Common Names |
|---------|----|--------------|
| 6 | 8 | Capric Acid |
| 7 | 10 | Lauric Acid |
| 8 | 12 | Myristic Acid |
| 9 | 14 | Palmitic Acid |
| 10 | 16 | Stearic Acid |
| 11 | 18 | Acradonic Acid |
| 12 | 20 | Benhenic Acid |

Compounds of the Present Invention

General Reaction Conditions

To a clean dry vessel, having a thermometer and capable of heating the contents to 200° C. is added the specified number of grams of dipentaerythritol. Next add the specified number of grams of the specified polyhydroxystearic acid. Next add the specified number of grams of the specified mono-fatty acid. Finally, add 0.1% by weight of stannous oxylate, based upon the total added. Heat to 180–220° C. and hold 8 hours. During this time the acid value will drop to vanishingly low levels water will distill off and the saponification value will approach theoretical. The product is filtered and used without additional purification.

Examples 13–20

| Ex- ample | Dipentaerythritol Example | Grams | Poly- hydroxystearic Example | Grams | Mono Acid Example | Grams |
|-------|---------|-------|---------|-------|---------|-------|
| 13 | 1 | 254.0 | 2 | 1680.0 | 6 | 344.0 |
| 14 | 1 | 254.0 | 3 | 2800.0 | 7 | 400.0 |
| 15 | 1 | 254.0 | 4 | 3916.0 | 8 | 456.0 |
| 16 | 1 | 254.0 | 5 | 5600.0 | 9 | 512.0 |
| 17 | 1 | 254.0 | 2 | 1680.0 | 10 | 568.0 |
| 18 | 1 | 254.0 | 3 | 2800.0 | 11 | 624.0 |
| 19 | 1 | 254.0 | 4 | 3916.0 | 12 | 680.0 |
| 20 | 1 | 254.0 | 5 | 5600.0 | 6 | 344.0 |

APPLICATIONS EXAMPLES

The polyesters of the present invention are polymeric and surprisingly allow for the incorporation of three (3) times their weight in water in oily systems. While not wanting to be bound by any one specific theory, this affinity for water appears to be due in large part to the free hydroxyl groups present in the molecule and the relatively high number of polar ester bonds in the center of this molecule. This ability to allow for the incorporation of water in oily systems makes these esters excellent additives to lip moisturizer. They permit water to be introduced into lipstick, and at the same time the lipstick remains hydrophobic, and occlusive providing both humectancy and long wear. The compounds of the present invention are odorless, tasteless, and safe, making them ideal for lipstick applications. These materials replace lanolin in formulations.

When formulated into a lipstick and compared to lanolin, the lipstick made with the esters of the present invention are creamier than the lanolin based products. They demold better (i.e. they release from the mold more efficiently) than the lanolin products, has a higher melting point (by about 5° C.) and are quite tasteless.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

What is claimed is:

1. A polyester conforming to the following structure;

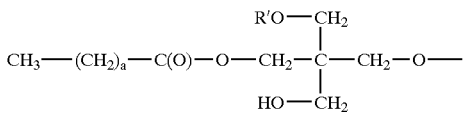

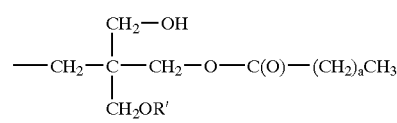

wherein
R' is

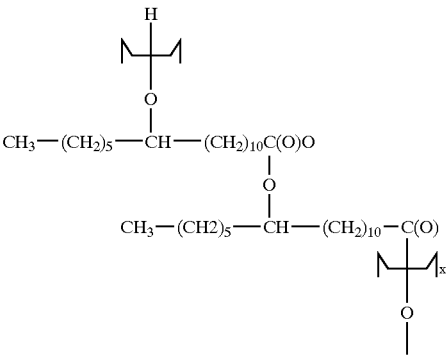

x is an integer ranging from 3 to 10;
a is an integer ranging from 8 to 20.

2. A polyester of claim 1 wherein x is an integer ranging from 18 to 20.

3. A polyester of claim 1 wherein x is 8.

4. A polyester of claim 1 wherein x is 10.

5. A polyester of claim 1 wherein x is 12.

6. A polyester of claim 1 wherein x is 14.

7. A polyester of claim 1 wherein x is 16.

8. A polyester of claim 1 wherein x is 18.

9. A polyester of claim 1 wherein x is 20.

10. A polyester of claim 1 wherein a is 3.

11. A polyester of claim 1 wherein a is 5.

12. A polyester of claim 1 wherein a is 7.

13. A polyester of claim 1 wherein x is 10.

14. A polyester made by the esterification reaction of:

(a) dipentaerythritol which conforms to the following structure;

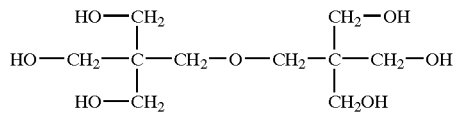

(b) a polymer made by the homopolymerization of 12 hydroxystearic acid conforming to the following structure:

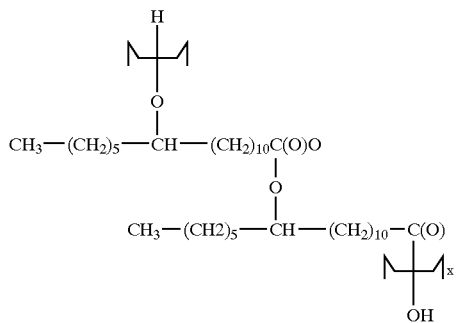

wherein:

x is an integer ranging from 3 to 10; and (c) a mono-functional fatty acid conforming to the following structure:

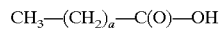

wherein a is an integer ranging from 8 to 20.

15. A polyester of claim 14 wherein x is 20.

16. A polyester of claim 14 wherein a is 3.

17. A polyester of claim 14 wherein a is 5.

18. A polyester of claim 14 wherein a is 7.

19. A polyester of claim 14 wherein x is 10.

* * * * *